United States Patent [19]

Jamieson

[11] Patent Number: 5,446,581
[45] Date of Patent: Aug. 29, 1995

[54] INVERTED TELEPHOTO WIDE-APERTURE WIDE-FIELD INFRARED LENS SYSTEM

[75] Inventor: Thomas H. Jamieson, Sunnyvale, Calif.

[73] Assignee: Lockheed Missiles & Space Co., Inc., Sunnyvale, Calif.

[21] Appl. No.: 227,086

[22] Filed: Apr. 13, 1994

Related U.S. Application Data

[63] Continuation of Ser. No. 31,445, Mar. 15, 1993, abandoned.

[51] Int. Cl.$^6$ .......................... G02B 9/12; G02B 13/14; G02B 13/18
[52] U.S. Cl. ..................... 359/357; 359/356; 359/716; 359/784
[58] Field of Search ............... 359/355, 356, 357, 781, 359/782, 784, 793, 716, 753, 783

[56] References Cited

U.S. PATENT DOCUMENTS

| | | | |
|---|---|---|---|
| 3,778,133 | 12/1973 | Tatian | 359/356 |
| 4,623,224 | 11/1986 | Clarke | 359/784 X |
| 4,679,891 | 7/1987 | Roberts | 359/784 X |
| 4,738,496 | 4/1988 | Canzek | 359/357 |
| 4,989,928 | 2/1991 | Fantozzi et al. | 359/356 |

Primary Examiner—William L. Sikes
Assistant Examiner—David R. Parsons
Attorney, Agent, or Firm—John J. Morrissey

[57] ABSTRACT

Design forms are disclosed for wide-field infrared imaging systems characterized by a large ratio of entrance aperture to focal length, where the limiting aperture stop is located in the converging image space.

7 Claims, 11 Drawing Sheets

FIG_2

FIG_5

FIG_8

_5,446,581_

INVERTED TELEPHOTO WIDE-APERTURE WIDE-FIELD INFRARED LENS SYSTEM

This is a continuation of application Ser. No. 08/031,445, filed Mar. 15, 1993 now abandoned.

TECHNICAL FIELD

This invention pertains generally to infrared imaging systems, and more particularly to infrared lens systems capable of operation simultaneously at a wide field of view and a wide relative aperture with a limiting aperture stop located in converging image space.

BACKGROUND ART

Lens systems of wide relative aperture are generally capable of forming bright images at low light levels. This capability is especially advantageous in infrared imaging applications in which the image-forming radiation consists of thermal emissions from the objects that are being imaged. However, lens systems of wide relative aperture have hitherto been capable of forming high-resolution images only over small fields of view (i.e., less than about 30°).

In a distortion-free imaging system, the image size is proportional to the tangent of the field angle. Consequently, if an imaging lens system having an extremely wide field of view is to be perfectly distortion free, the size of the image plane is correspondingly extremely large. However, in many applications requiring a wide-field lens system, it is beneficial to permit a certain amount of image distortion in order to accommodate an image plane of reasonable size. In practice, for many wide-field imaging applications, a condition in which image size is substantially proportional to the field angle itself (rather than to the tangent of the field angle) is deemed to provide acceptably small image distortion. The condition in which image size is substantially proportional to the field angle for a lens system having a wide field of view is called the f-$\theta$ condition.

Until the present invention, design forms had not been developed for infrared imaging systems that substantially meet the f-$\theta$ condition simultaneously for wide fields of view and for wide relative apertures.

A need has been experienced in the prior art for infrared lens systems having wide fields of view as well as wide relative apertures, which substantially meet the f-$\theta$ condition and have a limiting aperture stop in converging image space. For a lens system used in an infrared detection device, location of the limiting aperture stop in converging image space would allow the entire region of the lens system from the physical aperture stop to the image plane to be shielded and cooled (e.g., to cryogenic temperatures) so as to limit the amount of thermal radiation from the surrounding environment that can reach the detector. However, until the present invention, design forms had not been developed for infrared lens systems having wide fields of view (e.g., greater than one steradian) and wide relative apertures (e.g., greater than one-half focal length) for which the limiting aperture stop is located in converging image space.

SUMMARY OF THE INVENTION

It is an object of the present invention to provide design forms for infrared imaging systems capable of operation simultaneously at wide field of view and at wide relative aperture, and for which the image size is substantially proportional to the field angle—i.e., for which the f-$\theta$ condition substantially obtains.

It is a more particular object of the present invention to provide design forms for infrared imaging systems capable of operation simultaneously at fields of view greater than one steradian and at relative apertures greater than f/2, and for which the f-$\theta$ condition substantially obtains.

It is a further object of the present invention to provide design forms for infrared lens systems capable of operation simultaneously at wide field of view and at wide relative aperture, which substantially meet the f-$\theta$ condition and which have a limiting aperture stop located in the converging image space.

It is also an object of the present invention to provide design forms for infrared lens systems capable of operation simultaneously at wide field of view and at wide relative aperture, where each design form is characterized by:

a) a diverging front lens group, which functions to form a virtual image of a distant scene;
b) a converging rear lens group disposed coaxially with respect to the diverging front lens group to relay the virtual image to a focal surface; and
c) an intermediate lens group located coaxially between the diverging front lens group and the converging rear lens group, which coacts with the front lens group and the rear lens group to provide substantial correction for geometrical aberrations.

In accordance with the present invention, design forms are disclosed for infrared lens systems of wide relative aperture (i.e., greater than f/2) that provide high-resolution imagery for fields of view that approach 180° (i.e., almost a complete hemisphere). Infrared lens systems according to the present invention can be designed to such a scale as to be usable with small flat semiconductor array detectors having an area on the order of 1 square cm.

A semiconductor array detector manufactured for use in association with an infrared imaging system frequently includes a flat sealing window made of infrared-transmissive material. The sealing window of such a semiconductor array detector does not, per se, form part of the design form of the associated infrared imaging system—but can significantly affect the aberrational balance of the overall system. Accordingly, it is appropriate in certain applications for the sealing window to function as a lens element in order to minimize aberrations in the system.

BEST MODE OF CARRYING OUT THE INVENTION

Figure 1:
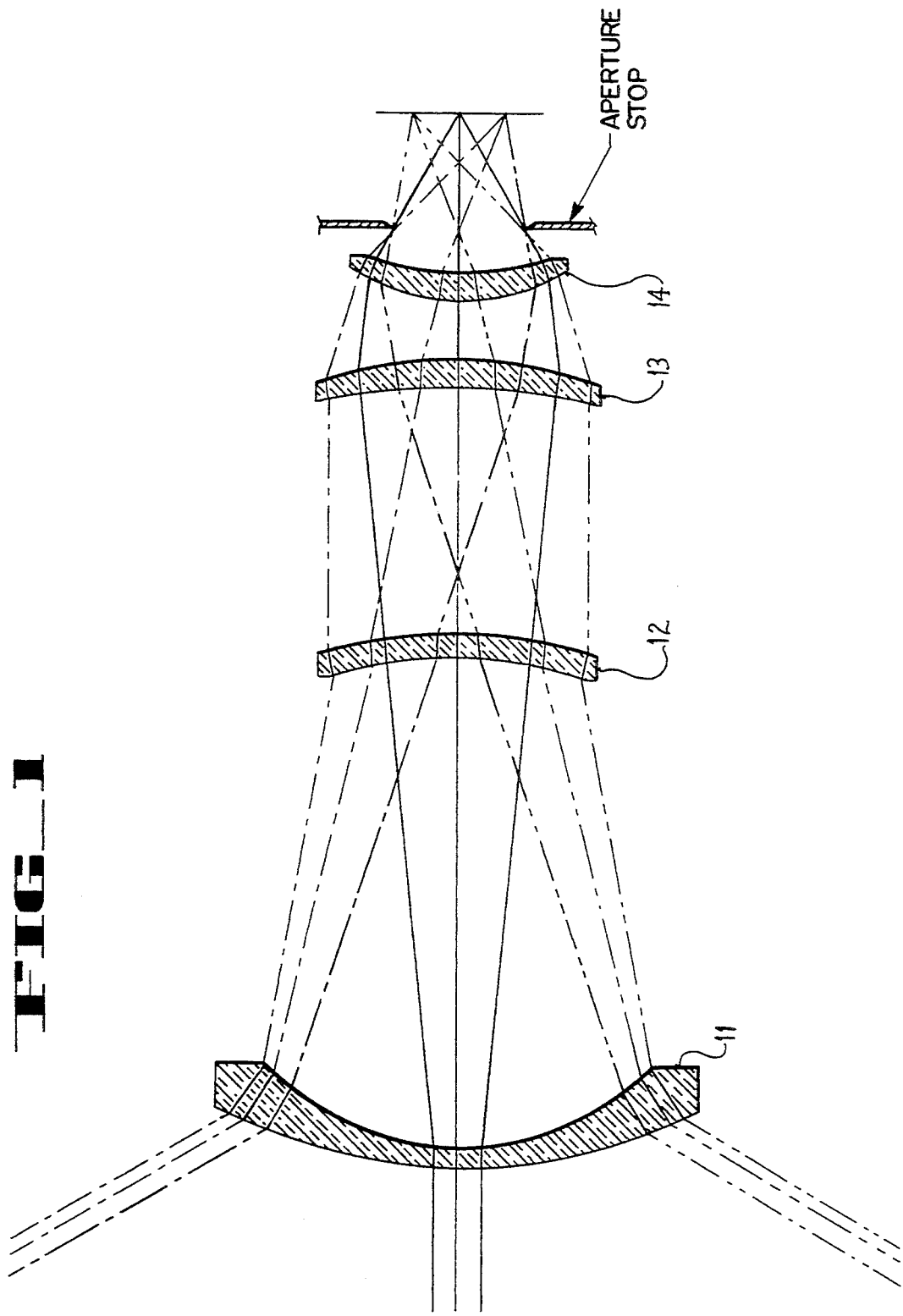
FIG. 1 is a profile drawing of a first embodiment of an infrared lens system according to the present invention.

In FIG. 1, a lens system according to a first embodiment of the present invention is illustrated, which has a field of view of 120° and a relative aperture of f/1, and which provides substantially diffraction-limited performance over an infrared wavelength range from 3.5 to 5.0 microns. The lens system of FIG. 1 comprises four lens elements 11, 12, 13 and 14, all of which are made of silicon. The lens elements 11, 12, 13 and 14 are configured and coaxially positioned with respect to each other according to an optical prescription specified in tabular format as follows:

TABLE I

| Surface No. | Radius (mm) | Thickness (mm) | Material |
| --- | --- | --- | --- |
| 1 | 65.99509 | 2.5 | Silicon |
| 2 | 34.37579 | 60.0 | |
| 3 | −59.88651 | 3.0 | Silicon |
| | Conic constant: 6.313089 | | |
| 4 | −58.88825 | 30.0 | |
| 5 | −76.93851 | 3.5 | Silicon |
| 6 | −52.16937 | 7.0 | |
| 7 | 25.90995 | 3.5 | Silicon |
| 8 | 37.17134 | 5.0 | |
| Aperture stop | ∞ | 14.465740 | |
| Image plane | ∞ | | | where the surfaces of the lens elements are numbered consecutively from left to right along an optic axis in accordance with optical design convention. Thus, surfaces No. 1 and No. 2 are the left and right surfaces, respectively, of the lens element 11. Similarly, surfaces No. 3 and No. 4 are the left and right surfaces, respectively, of the lens element surfaces No. 5 and No. 6 are the left and right surfaces, respectively, of the lens element 13; and surfaces No. 7 and No. 8 are the left and right surfaces, respectively, of the lens element 14.

The radius listed in the second column for each of the lens surfaces in Table I is the radius of curvature (expressed in millimeters). All of the lens surfaces are spherical except for surface No. 3, which is a conic surface with a conic constant of 6.313089. The conic nature of surface No. 3 greatly facilitates correction of spherical aberration. In accordance with optical design convention, the radius of curvature of a specified lens surface is positive if the center of curvature of the surface lies to the right of the surface, and negative if the center of curvature of the surface lies to the left of the surface. The thickness listed in the third column for each of the lens surfaces in Table I is the axial thickness (expressed in millimeters) of the lens element bounded on the left by the specified surface, or the axial separation (i.e., air gap) between the specified surface and the next adjacent lens element to the right of the specified surface.

The lens system illustrated in FIG. 1 has been designed for a focal length of 6 mm and an entrance pupil diameter of 6 mm, and provides substantially diffraction-limited performance over the wavelength range from 3.5 to 5.0 microns. The variation of the index of refraction with wavelength for silicon in that wavelength range is indicated as follows:

TABLE II

| Material | Wavelength (microns) | | |
| --- | --- | --- | --- |
| | 3.5μ | 4.0μ | 5.0μ |
| Silicon | 3.428117 | 3.425406 | 3.422272 |

It is apparent from TABLE II that the index of refraction for silicon varies only in the third decimal place over the wavelength range from 3.5 to 5.0 microns.

Figure 2:
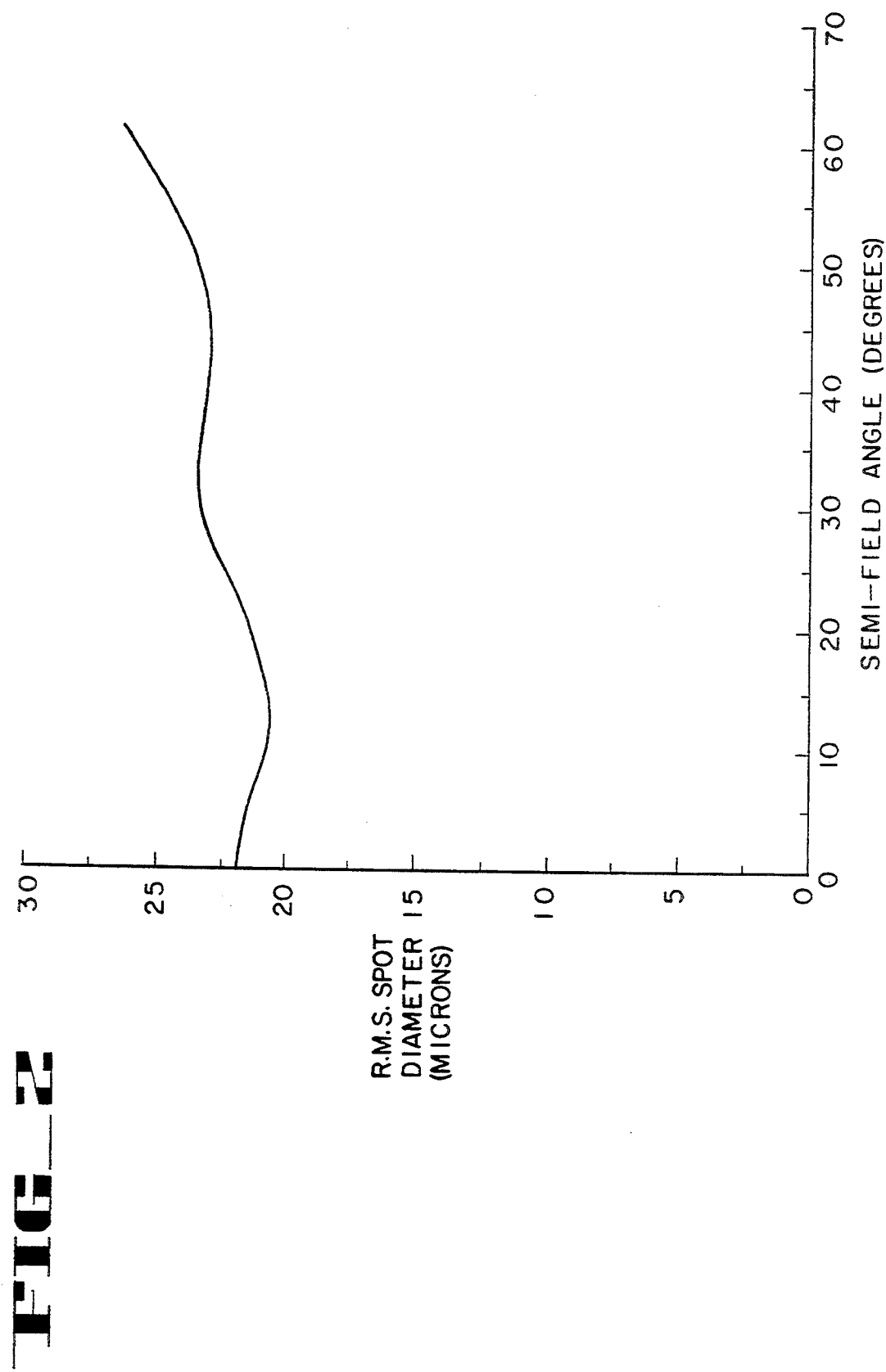
FIG. 2 is a plot of root-mean-square (RMS) spot diameter versus semi-field angle for the infrared lens system of FIG. 1.

In FIG. 2, the root-mean-square (RMS) spot diameter is plotted as a function of semi-field angle for the lens system of FIG. 1 to provide a graphical indication of performance. The curve in FIG. 2 shows that the RMS spot diameter varies over a field of view of 120° (i.e., a semi-field angle of 60°) from 22 microns at 0° (i.e., at the center of the field) to 26 microns at 120° (i.e., at the edge of the field).

Figure 3:
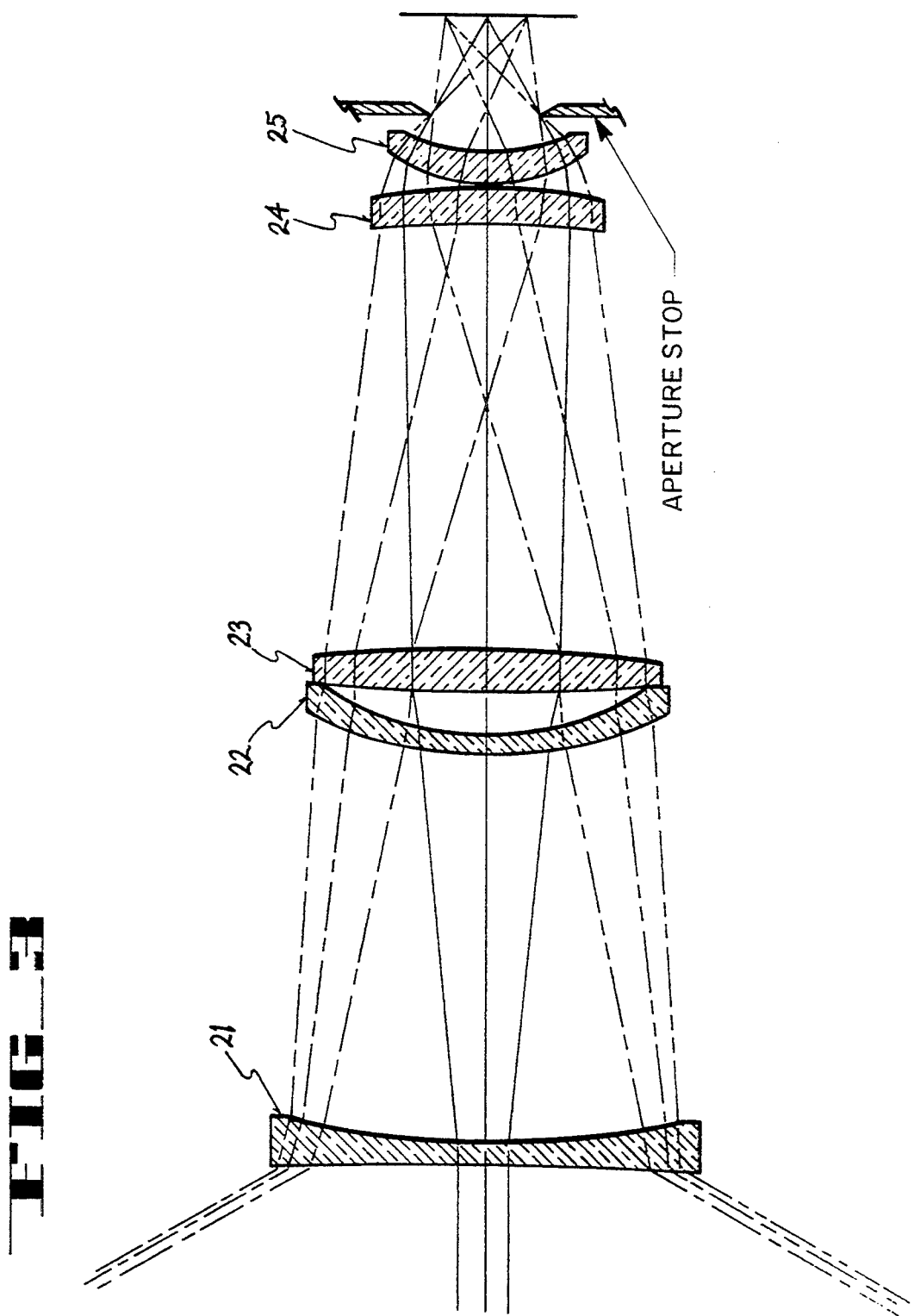
FIG. 3 is a profile drawing of a second embodiment of an infrared lens system according to the present invention.

In FIG. 3, a lens system according to a second embodiment of the present invention is illustrated, which likewise has a field of view of 120° and a relative aperture of f/1, and which also provides substantially diffraction-limited performance over an infrared wavelength range from 3.5 to 5.0 microns. The lens system of FIG. 3 comprises five lens elements 21, 22, 23, 24 and 25 for which all the lens surfaces are spherical. The lens elements 21 and 22 are made of germanium, and the lens elements 23, 24 and 25 are made of silicon. The lens elements 21, 22, 23, 24 and 25 are configured and coaxially positioned with respect to each other according to an optical prescription specified in tabular format as follows:

TABLE III

| Surface No. | Radius (mm) | Thickness (mm) | Material |
| --- | --- | --- | --- |
| 1 | −513.31095 | 2.5 | Germanium |
| 2 | 107.11530 | 45.0 | |
| 3 | 49.13908 | 2.5 | Germanium |
| 4 | 36.94364 | 5.0 | |
| 5 | 252.05523 | 4.5 | Silicon |
| 6 | −141.87030 | 50.0 | |
| 7 | −117.37876 | 3.5 | Silicon |
| 8 | −68.33107 | 1.0 | |
| 9 | 19.50573 | 3.5 | Silicon |
| 10 | 24.59003 | 5.0 | |
| Aperture stop | ∞ | 10.699595 | |
| Image plane | ∞ | | | where the surfaces of the lens elements are numbered consecutively from left to right along the optic axis according to the convention described above in connection with TABLE I. The use of germanium in combination with silicon for the lens elements of the lens system shown in FIG. 3 allows correction for chromatic aberration to be achieved. In developing the optical prescription for the lens system of FIG. 3, the lens element 12 of the lens system of FIG. 2 (with the conic surface No. 3) is replaced by the two lens elements 22 and 23 with spherical surfaces, which provide a comparable degree of correction for spherical aberration.

The variation of the index of refraction with wavelength in the wavelength range from 3.5 to 5.0 microns for germanium and silicon (i.e., the materials from which the lens elements of the lens system of FIG. 3 are made) is indicated as follows:

TABLE IV

| Material | Wavelength (microns) | | |
|---|---|---|---|
| | 3.5μ | 4.0μ | 5.0μ |
| Germanium | 4.032548 | 4.024610 | 4.015388 |
| Silicon | 3.428117 | 3.425406 | 3.422272 |

It is apparent from TABLE IV that the index of refraction for germanium varies only in the second decimal place, and the index of refraction for silicon varies only in the third decimal place, over the wavelength range from 3.5 to 5.0 microns.

Figure 4:
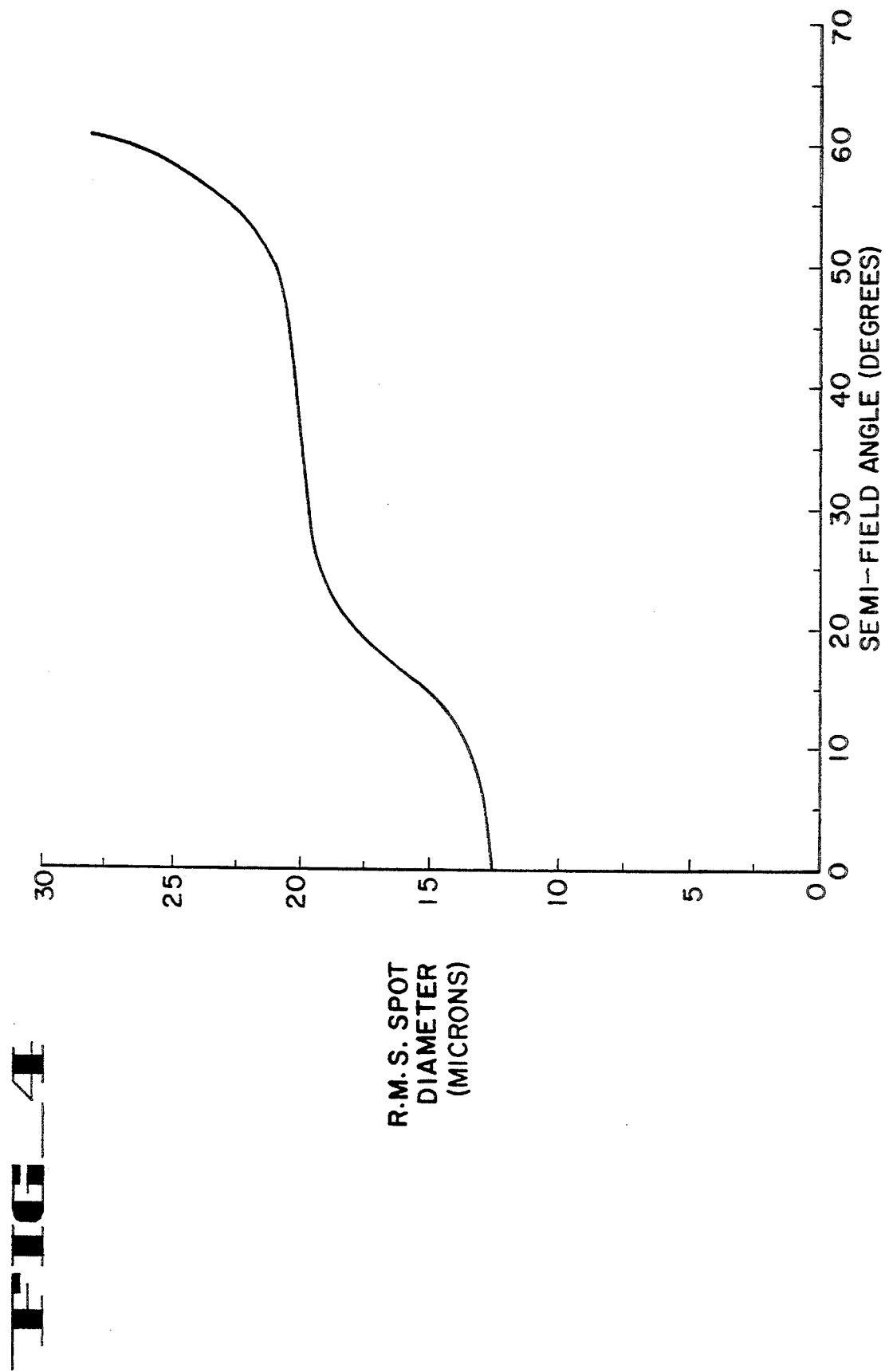
FIG. 4 is a plot of RMS spot diameter versus semi-field angle for the infrared lens system of FIG. 3.

In FIG. 4, RMS spot diameter is plotted as a function of semi-field angle for the lens system of FIG. 3 to provide a graphical indication of performance. The curve in FIG. 4 shows that the RMS spot diameter varies over a field of view of 120° (i.e., a semi-field angle of 60°) from 12.6 microns at 0° to 27 microns at 120°. Thus, it is apparent that the correction of chromatic aberration achieved by the design form illustrated in FIG. 3 is especially good at the center of the field of view, although it degrades somewhat at the edge of the field.

Figure 5:
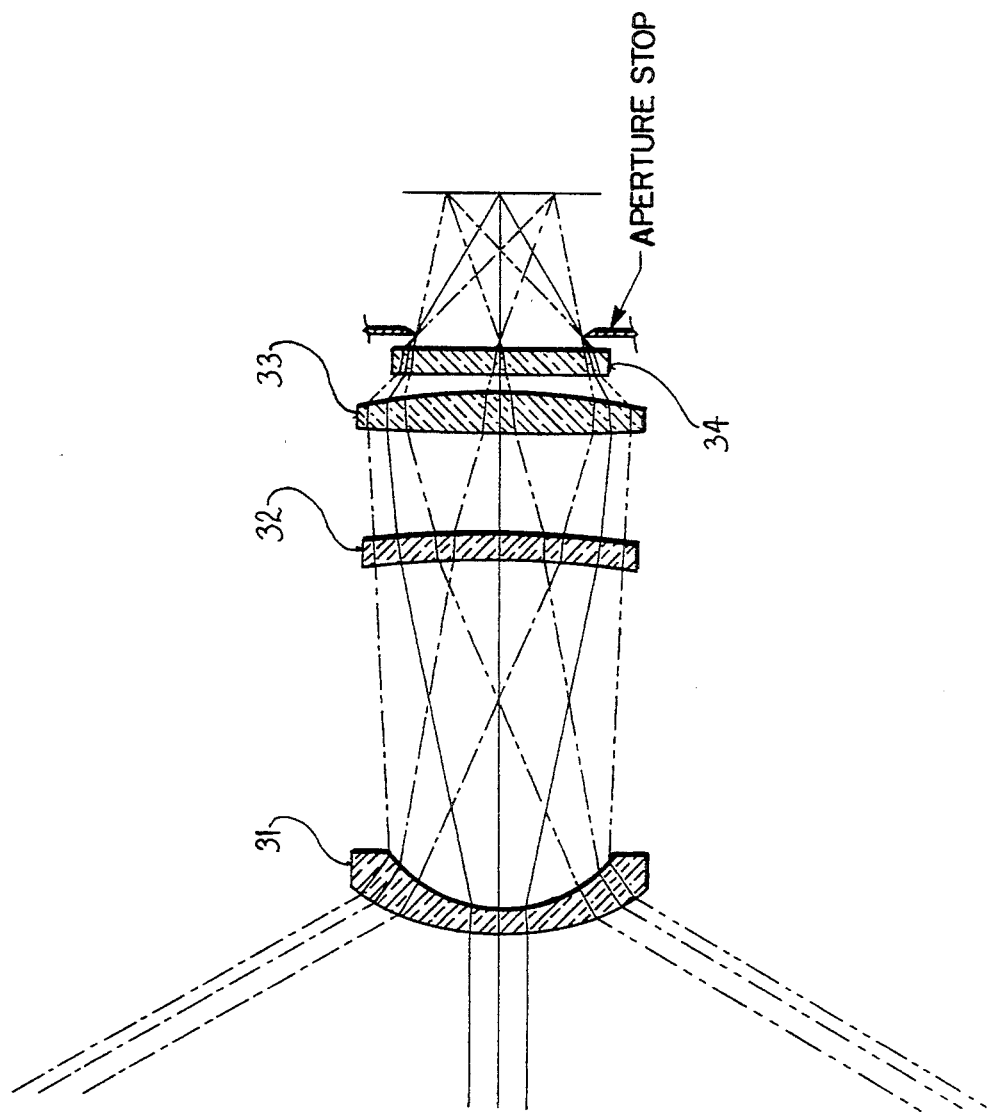
FIG. 5 is a profile drawing of a third embodiment of an infrared lens system according to the present invention.

In FIG. 5, a lens system according to a third embodiment of the present invention is illustrated, which also has a field of view of 120° and a relative aperture of f/1. The lens system of FIG. 5 was designed for a particular application requiring a focal length of 6 mm and an entrance pupil diameter of 6 mm, and requiring a sealing window near the aperture stop. Accordingly, the lens system illustrated in FIG. 5 comprises four lens elements 31, 32, 33 and 34 of which the lens element 34 functions as a sealing window for a semiconductor array detector. In a different application, the basic design form of the lens system of FIG. 5 could be used without the lens element 34.

As illustrated in FIG. 5, the lens elements 31 and 32 are made of germanium, and the lens elements 33 and 34 are made of silicon. The lens elements 31, 32, 33 and 34 are configured and coaxially positioned with respect to each other according to an optical prescription specified in tabular format as follows:

The particular application for which the lens system of FIG. 5 was designed requires diffraction-limited performance in the relatively narrow wavelength range from 4.3 to 4.9 microns. The variation of the index of refraction with wavelength for germanium and silicon (i.e., the materials from which the lens elements of the lens system of FIG. 5 are made) in the wavelength range from 4.3 to 4.9 microns is indicated as follows:

TABLE VI

| Material | Wavelength (microns) | | |
|---|---|---|---|
| | 4.3μ | 4.6μ | 4.9μ |
| Germanium | 4.021147 | 4.018351 | 4.016060 |
| Silicon | 3.424224 | 3.423273 | 3.422498 |

It is apparent from TABLE VI that the index of refraction for germanium varies only in the second decimal place, and the index of refraction for silicon varies only in the third decimal place, over the wavelength range from 4.3 to 4.9 microns.

The lens element (i.e., sealing window) 34 in the embodiment of FIG. 5 significantly contributes to monochromatic and chromatic aberrations of the overall system. However, the design form achieved utilizing the sealing window 34 allows the aperture stop to be located to the rear of the sealing window 34, so that the entire region between the aperture stop and the semiconductor array detector can be cooled to cryogenic temperatures by an appropriate cooling apparatus in order to optimize the sensitivity of the detector. In order to compensate for the aberrations attributable to the lens element 34, surface No. 2 of the lens element 31 is conic, and surface No. 3 of the lens element 32 has a general aspheric configuration.

Figure 6:
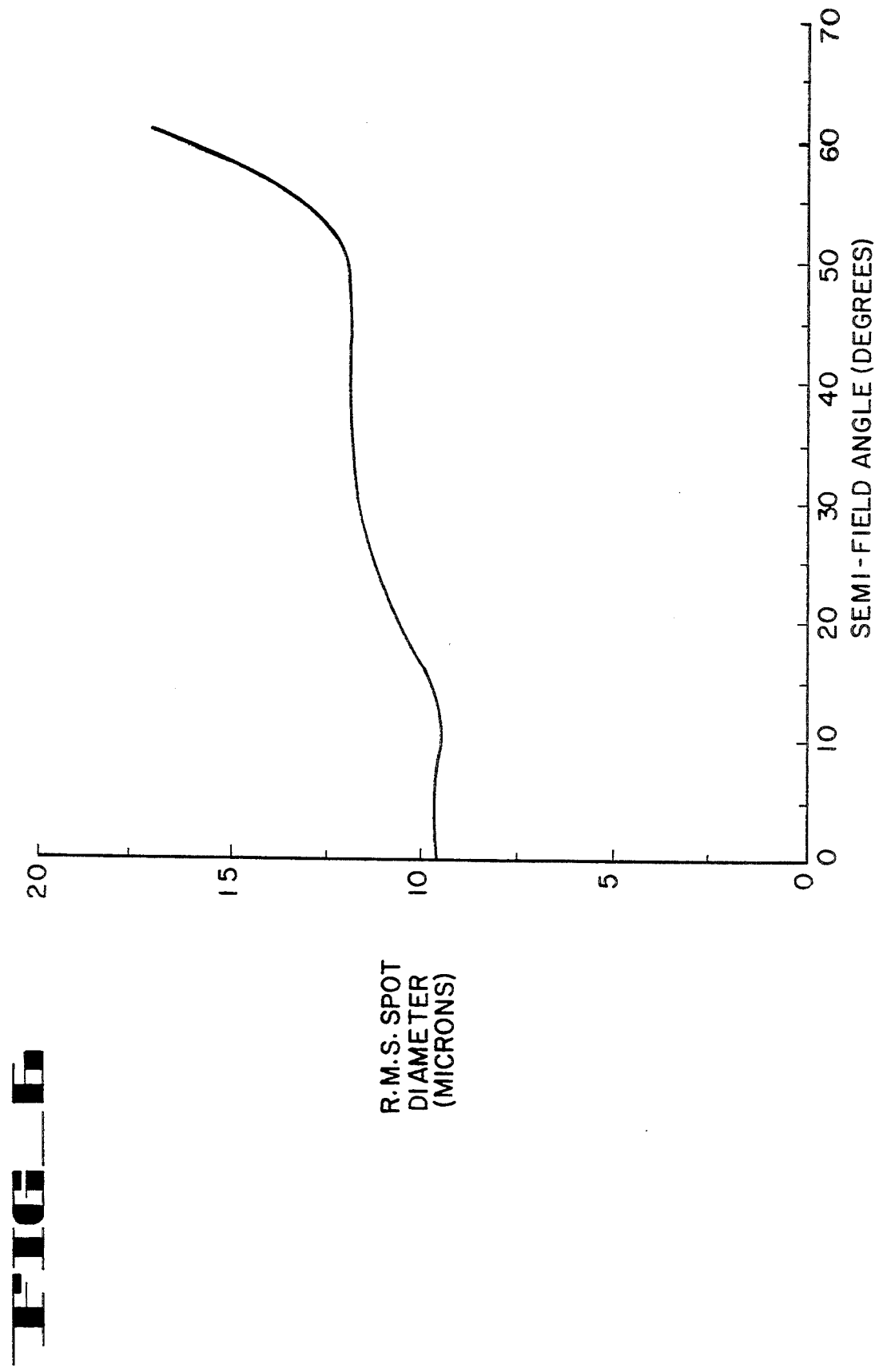
FIG. 6 is a plot of RMS spot diameter versus semi-field angle for the infrared lens system of FIG. 5.

In FIG. 6, RMS spot diameter is plotted as a function of semi-field angle for the lens system of FIG. 5 to provide a graphical indication of performance. The curve in FIG. 6 shows that over a field of view of 120° (i.e., a semi-field angle of 60°) the RMS spot diameter varies from 9.6 microns at the center of the field to 16.6 microns at the edge of the field.

Figure 7:
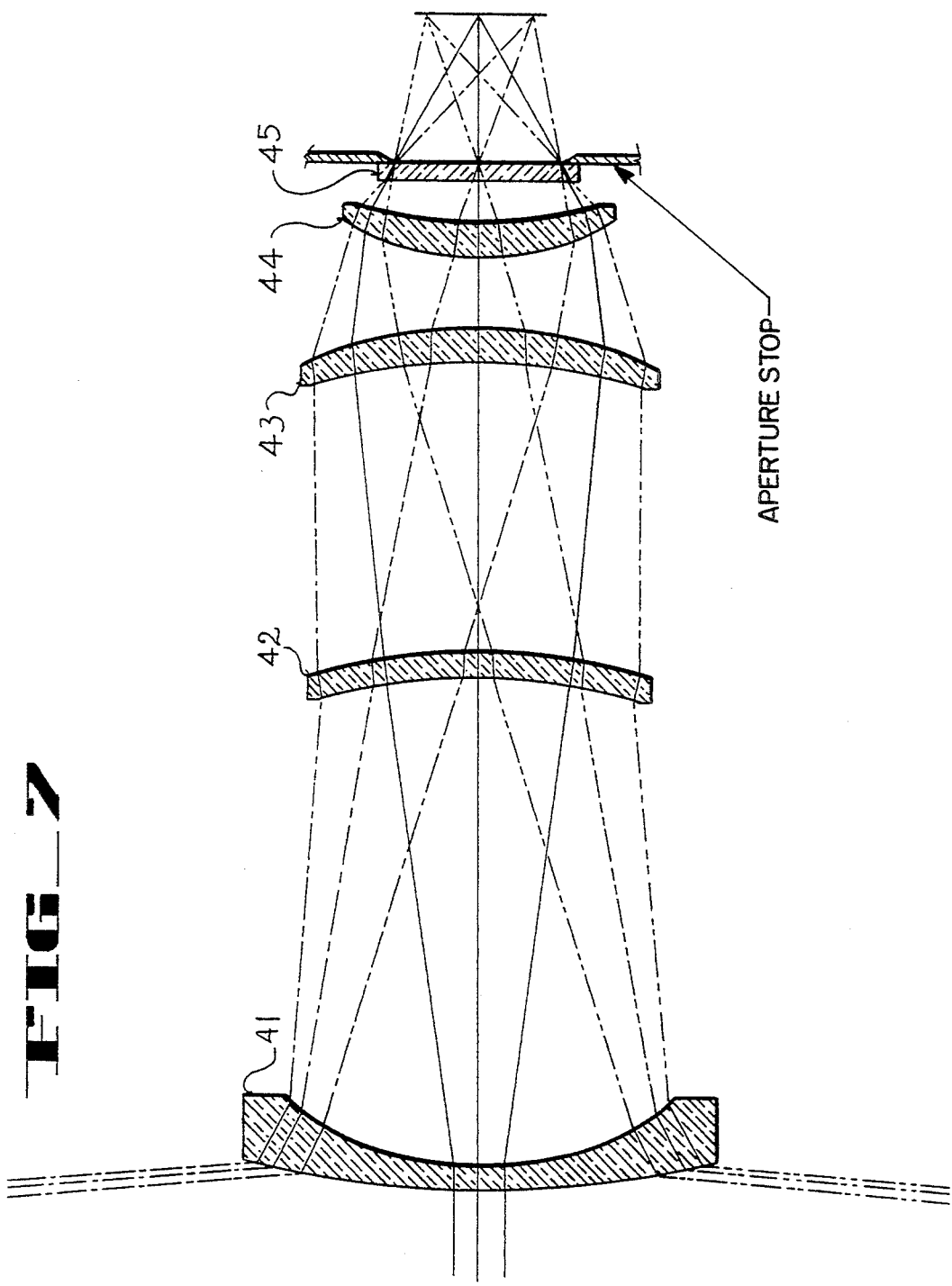
FIG. 7 is a profile drawing of a fourth embodiment of an infrared lens system according to the present invention.

In FIG. 7, a lens system according to a fourth embodiment of the present invention is illustrated, which has an exceptionally wide field of view of 170° as well as a relative aperture of f/1. The lens system of FIG. 7 provides substantially diffraction-limited performance over an infrared wavelength range from 3.5 to 5.0 mi-

TABLE V

| Surface No. | Radius (mm) | Thickness (mm) | Material |
|---|---|---|---|
| 1 | 27.69562 | 2.5 | Germanium |
| 2 | 16.06076 | 35.0 | |
| | Conic constant: 0.256502 | | |
| 3 | −292.29014 | 3.0 | Germanium |
| | Conic constant: 3.477239 | | |
| Aspheric coefficients: | | | |
| A = .847012 × 10⁻⁵ | B = .101446 × 10⁻⁷ | C = .268179 × 10⁻¹¹ | D = .158740 × 10⁻¹² . |
| 4 | −89.53092 | 10.0 | |
| 5 | 238.76154 | 4.0 | Silicon |
| 6 | −62.61080 | 2.0 | |
| 7 | ∞ | 2.5 | Silicon |
| 8 | ∞ | 1.0 | |
| Aperture stop | ∞ | 15.162707 | |
| Image plane | ∞ | | | where the surfaces of the lens elements are numbered consecutively from left to right along the optic axis according to the convention described above in connection with TABLE I.

crons. The particular lens system illustrated in FIG. 7 was designed for an application requiring a focal length of 6 mm and an entrance pupil diameter of 6 mm, and requiring a sealing window precisely at the aperture stop. Accordingly, the lens system illustrated in FIG. 7 comprises four lens element 41, 42, 43, 44 and 45 of which the lens element 45 functions as a sealing window for a semiconductor array detector. The lens element 41, 42, 43 and 44 are made of silicon, and the lens element 45 is made of sapphire. The lens element 41, 42, 43 and 44 are configured and coaxially positioned with respect to each other according to an optical prescription specified in tabular format as follows:

TABLE VII

| Surface No. | Radius (mm) | Thickness (mm) | Material |
| --- | --- | --- | --- |
| 1 | 122.24468 | 2.5 | Silicon |
| 2 | 36.29113 | 56.0 | |
| 3 | −76.15656 | 3.0 | Silicon |
| | Conic constant: 7.924001 | | |
| 4 | −65.17392 | 33.0 | |
| 5 | −71.96637 | 3.5 | Silicon |
| 6 | −53.16908 | 9.0 | |
| 7 | 33.25649 | 3.5 | Silicon |
| 8 | 51.89328 | 5.0 | |
| 9 | ∞ | 2.0 | Sapphire |
| Aperture stop | ∞ | 17.109679 | |
| Image plane | ∞ | | | where the surfaces of the lens elements are numbered consecutively from left to right along the optic axis according to the convention described above in connection with TABLE I.

The variation of the index of refraction with wavelength for silicon and sapphire (i.e., the materials from which the lens elements of the lens system of FIG. 7 are made) in the wavelength range from 3.5 to 5.0 microns is indicated as follows:

TABLE VIII

| Material | Wavelength (microns) | | |
| --- | --- | --- | --- |
| | 3.5μ | 4.0μ | 5.0μ |
| Silicon | 3.428117 | 3.425406 | 3.422272 |
| Sapphire | 1.695326 | 1.675244 | 1.623989 |

It is apparent from TABLE VIII that the index of refraction for silicon varies only in the third decimal place, and the index of refraction for sapphire varies only in the second decimal place, over the wavelength range from 3.5 to 5.0 microns.

The lens element (i.e., sealing window) 45 in the embodiment of FIG. 7 significantly contributes to monochromatic and chromatic aberrations of the overall system. However, the aperture stop to be located to the rear of the sealing window 45, so that the entire region between the aperture stop and the semiconductor array detector can be cooled to cryogenic temperatures by an appropriate cooling apparatus in order to optimize the sensitivity of the detector.

Figure 8:
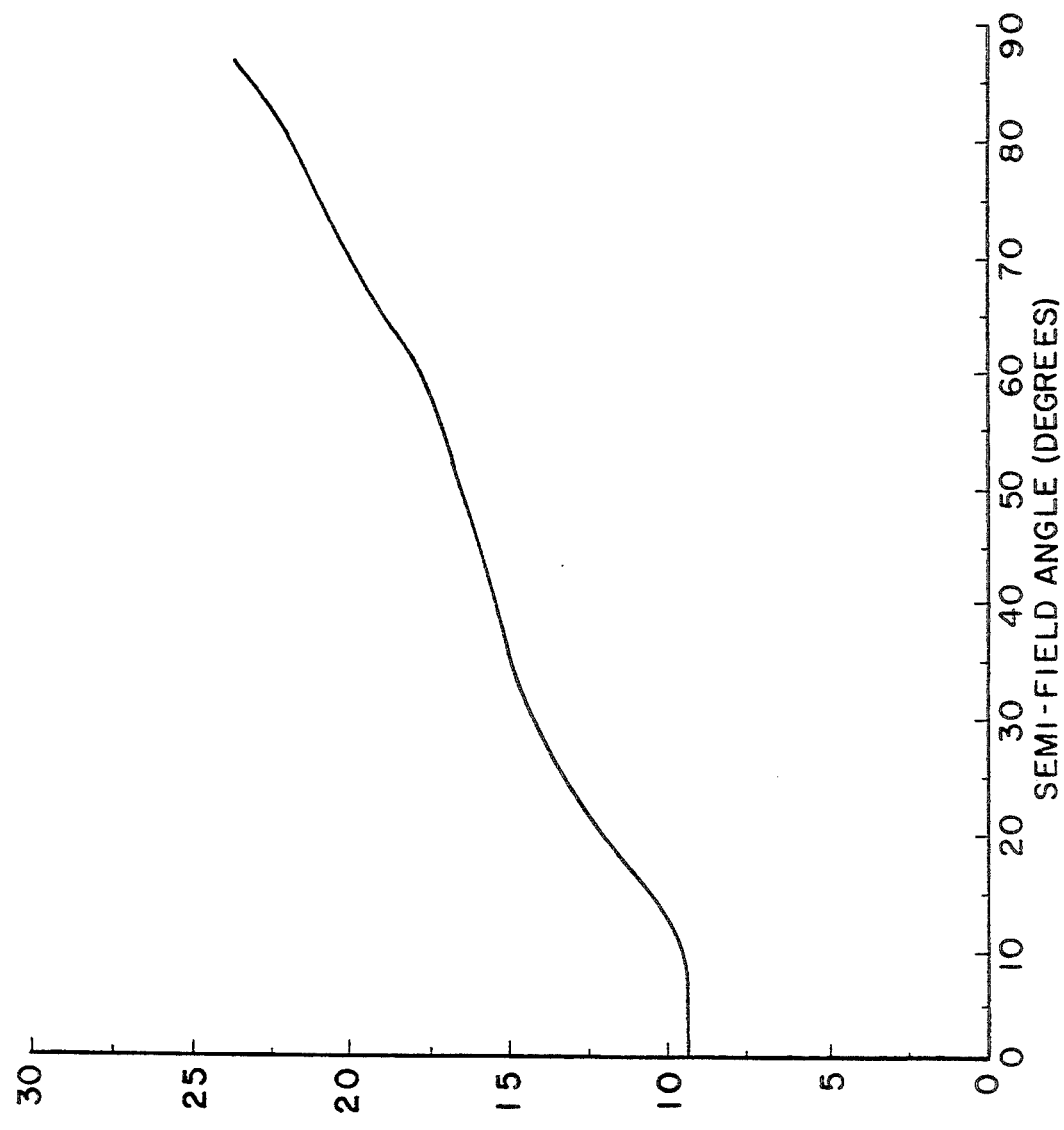
FIG. 8 is a plot of RMS spot diameter versus semi-field angle for the infrared lens system of FIG. 7.

In FIG. 8, RMS spot diameter is plotted as a function of semi-field angle for the lens system of FIG. 7 to provide a graphical indication of performance. The curve in FIG. 8 shows that over a field of view of 170° (i.e., a semi-field angle of 85°) the RMS spot diameter varies from 9.5 microns at the center of the field to 23.3 microns at the edge of the field.

Figure 9:
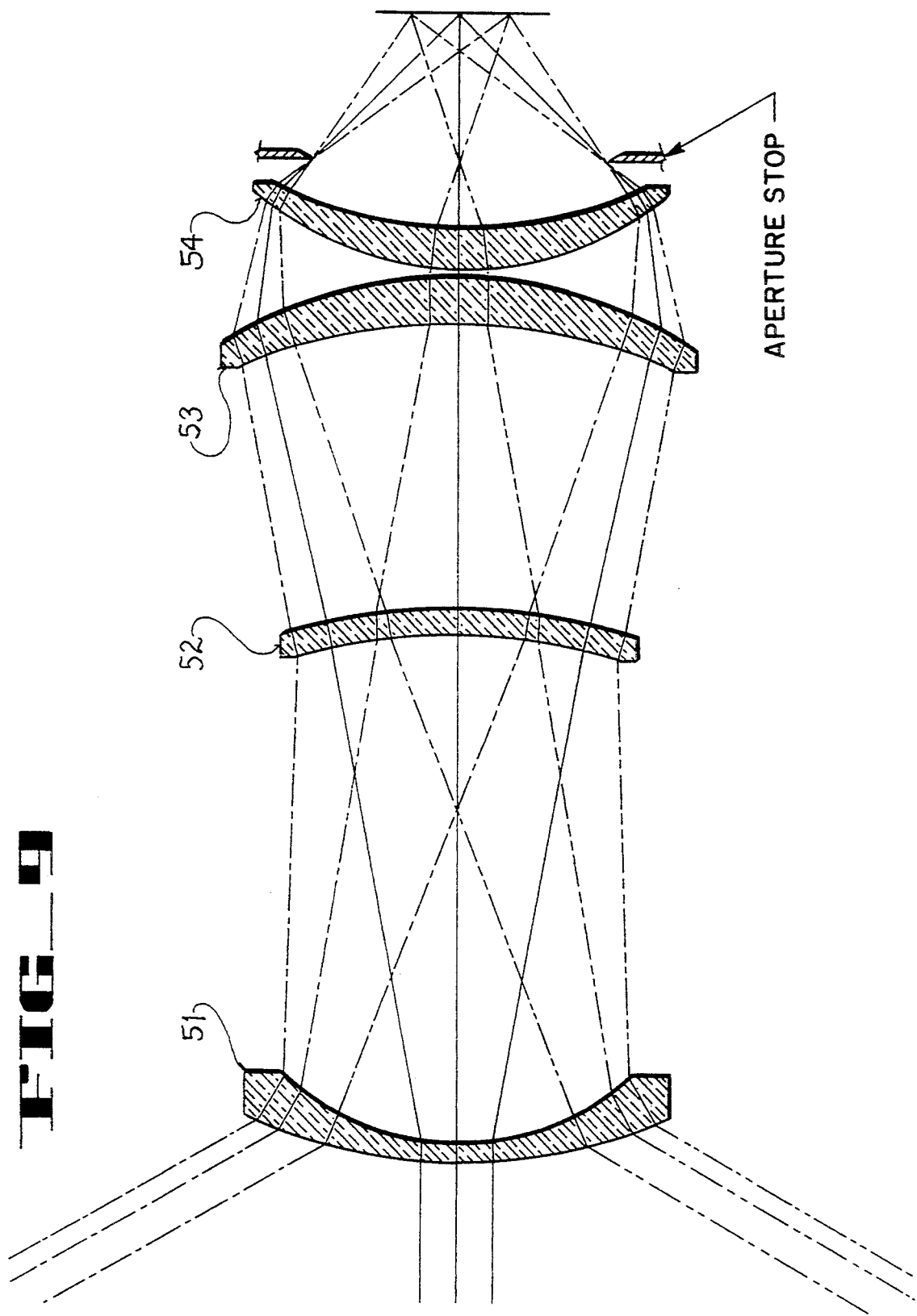
FIG. 9 is a profile drawing of a fifth embodiment of an infrared lens system according to the present invention.

In FIG. 9, a lens system according to a fifth embodiment of the present invention is illustrated, which has a field of view of 120° and a relative aperture of f/0.7. The lens system of FIG. 9 provides substantially diffraction-limited performance over a longer infrared wavelength range from 8.0 to 12.0 microns, and was designed for an application requiring a focal length of 6 mm and an entrance pupil diameter of 8.6 mm. All the lens elements of the lens system of FIG. 9 are made of germanium. The lens system of FIG. 9 comprises four lens elements 31, 32, 33 and 34, which are configured and coaxially positioned with respect to each other according to an optical prescription specified in tabular format as follows:

TABLE IX

| Surface No. | Radius (mm) | Thickness (mm) | Material |
| --- | --- | --- | --- |
| 1 | 62.41336 | 2.5 | Germanium |
| 2 | 32.07998 | 60.0 | |
| 3 | −82.42941 | 3.0 | Germanium |
| | Conic constant: 9.118296 | | |
| 4 | −74.76767 | 34.0 | |
| 5 | −64.26079 | 5.0 | Germanium |
| 6 | −53.56433 | 1.0 | |
| 7 | 38.22219 | 5.0 | Germanium |
| 8 | 53.00037 | 8.0 | |
| Aperture stop | ∞ | 17.435026 | |
| Image plane | ∞ | | | where the surfaces of the lens elements are numbered consecutively from left to right along the optic axis according to the convention described above in connection with TABLE I.

The variation of the index of refraction with wavelength for germanium (i.e., the material from which the lens elements of the lens system of FIG. 9 are made) in the wavelength range from 3.5 to 5.0 microns is indicated as follows:

TABLE X

| Material | Wavelength (microns) | | |
| --- | --- | --- | --- |
| | 8.0μ | 10.0μ | 12.0μ |
| Germanium | 4.005260 | 4.003073 | 4.002073 |

It is apparent from TABLE X that the index of refraction for germanium varies only in the third decimal place over the wavelength range from 3.5 to 5.0 microns.

Figure 10:
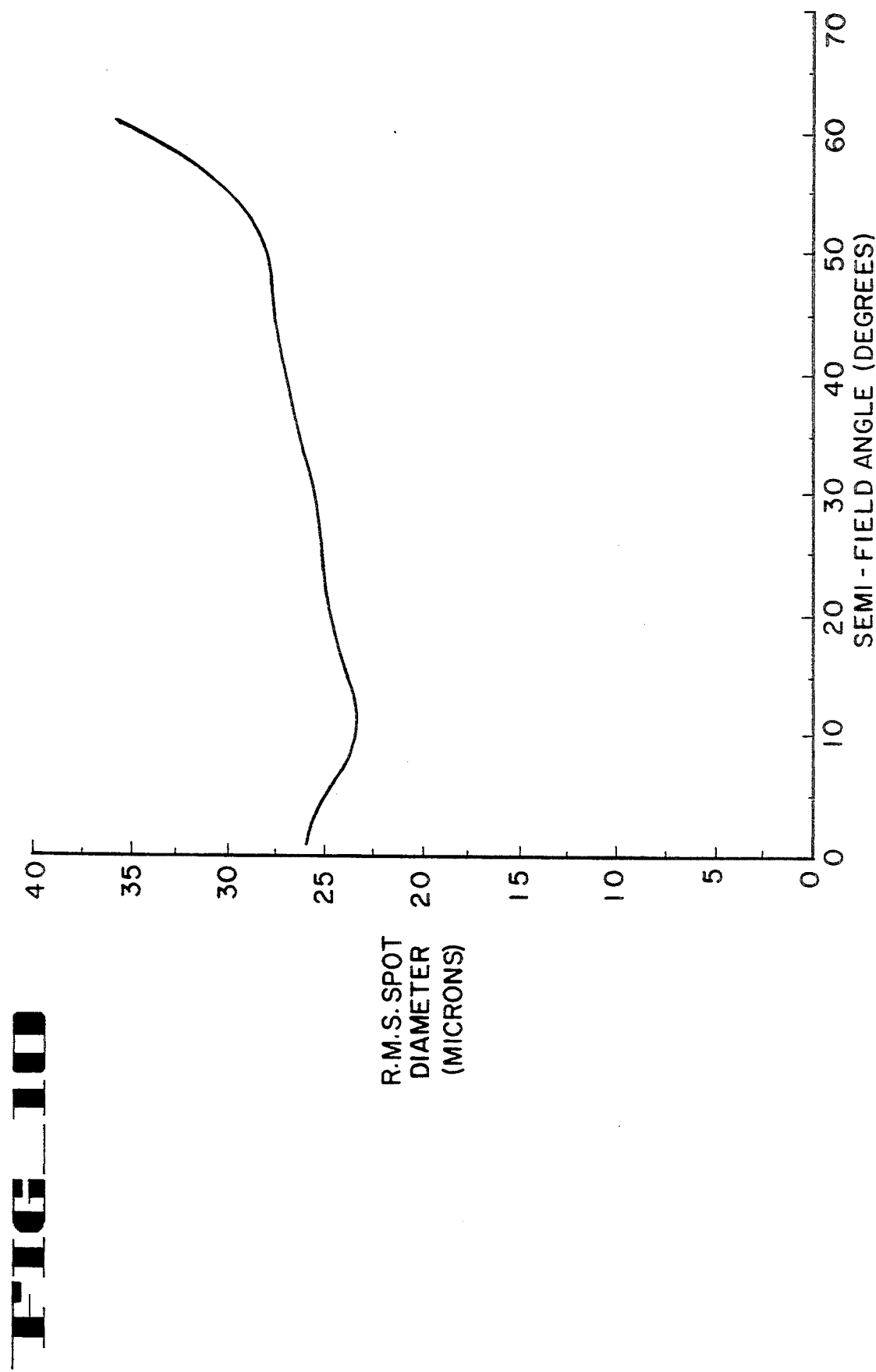
FIG. 10 is a plot of RMS spot diameter versus semi-field angle for the infrared lens system of FIG. 9.

In FIG. 10, RMS spot diameter is plotted as a function of semi-field angle for the lens system of FIG. 9 to provide a graphical indication of performance. The curve in FIG. 10 shows that over a field of view of 120° (i.e., a semi-field angle of 60°) the RMS spot diameter varies from 26 microns at the center of the field to 35 microns at the edge of the field.

Figure 11:
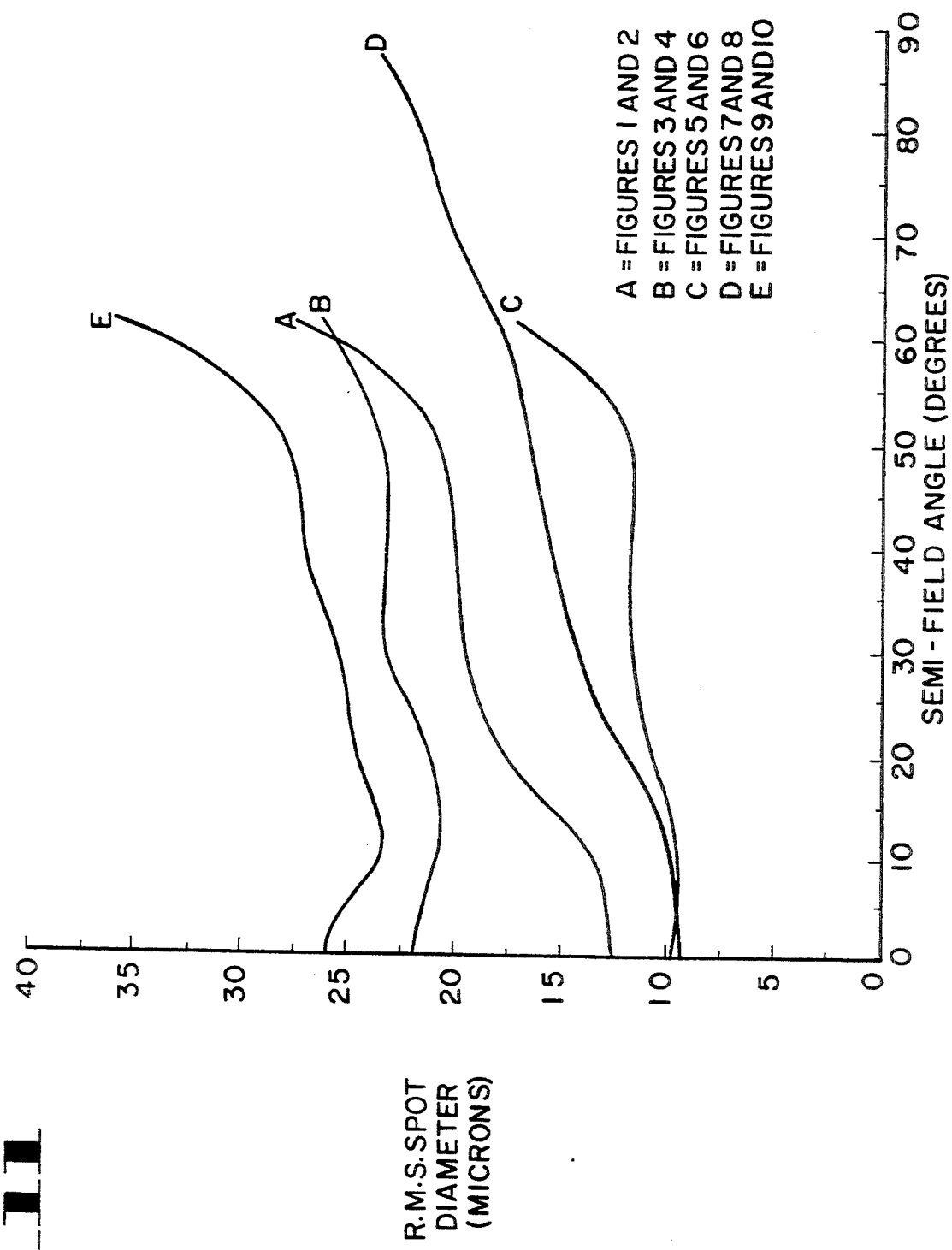
FIG. 11 is a graphical illustration in which the plots of RMS spot diameter versus semi-field angle as shown in FIGS. 2, 4, 6, 8 and 10 are superimposed on a common set of axes.

In FIG. 11, the plots of RMS spot diameter versus semi-field angle for the various embodiments of the present invention as illustrated in FIGS. 1, 3, 5, 7 and 9 are superimposed on a single set of axes for purposes of easy comparison. It is readily apparent from FIG. 11 that every illustrated embodiment of the invention has an RMS spot diameter of less than 25 microns for a field angle up to 90° (i.e., a semi-field angle of 45°).

The present invention has been described above in terms of design forms developed for use in particular applications. However, variations on the above-disclosed design forms (as optimized for use in different applications) would be within the scope of the invention, and would become apparent to practitioners skilled in the art of optical design upon perusal of the foregoing specification and accompanying drawing. Accordingly, the invention is defined more generally by the following claims and their equivalents.

I claim:

1. An optical system for forming an infrared image of a substantially infinitely distant scene on a focal surface located at a finite distance from said system, said system comprising:
  a) a diverging front lens group, said front lens group functioning to form a virtual image of said infinitely distant scene;
  b) a converging rear lens group disposed coaxially with respect to said diverging front lens group along an optic axis, said rear lens group functioning to relay said virtual image to said focal surface; and
  c) an intermediate lens group located coaxially between said front lens group and said rear lens group, said intermediate lens group coacting with said diverging front lens group and said converging rear lens group to provide substantial correction for geometrical aberrations.

2. An optical system for forming an infrared image of a distant scene on a focal surface, said system having a relative aperture greater than f/2 and an angular field of view greater than one steradian, said system comprising:
  a) a diverging front lens group, said front lens group functioning to form a virtual image of said scene:
  b) a converging rear lens group disposed coaxially with respect to said diverging front lens group along an optic axis, said rear lens group functioning to relay said virtual image to said focal surface;
  c) an intermediate lens group located coaxially between said front lens group and said rear lens group, said intermediate lens group coacting with said diverging front lens group and said converging rear lens group to provide substantial correction for geometrical aberrations: and
  d) means forming an aperture stop in a converging region between said converging rear lens group and said focal surface.

3. The optical system of claim 2 comprising lens elements configured and positioned with respect to each other along said optic axis substantially according to a design form specified as follows:

| Surface No. | Radius (mm) | Thickness (mm) | Material |
|---|---|---|---|
| 1 | 66.0 | 2.5 | Silicon |
| 2 | 34.38 | 60.0 | |
| 3 | −59.89 | 3.0 | Silicon |
| Conic constant: 6.313089 | | | |
| 4 | −58.89 | 30.0 | |
| 5 | −76.94 | 3.5 | Silicon |
| 6 | −52.17 | 7.0 | |
| 7 | 25.91 | 3.5 | Silicon |
| 8 | 37.17 | 5.0 | |
| Aperture stop | ∞ | 14.5 | |

| Surface No. | Radius (mm) | Thickness (mm) | Material |
|---|---|---|---|
| Image plane | ∞ | | | where the surfaces of the lens elements are numbered consecutively from left to right along the optic axis.

4. The optical system of claim 2 comprising lens elements configured and positioned with respect to each other along said optic axis substantially according to a design form specified as follows:

| Surface No. | Radius (mm) | Thickness (mm) | Material |
|---|---|---|---|
| 1 | −513.31 | 2.5 | Germanium |
| 2 | 107.12 | 45.0 | |
| 3 | 49.14 | 2.5 | Germanium |
| 4 | 36.94 | 5.0 | |
| 5 | 252.06 | 4.5 | Silicon |
| 6 | −141.87 | 50.0 | |
| 7 | −117.38 | 3.5 | Silicon |
| 8 | −68.33 | 1.0 | |
| 9 | 19.51 | 3.5 | Silicon |
| 10 | 24.59 | 5.0 | |
| Aperture stop | ∞ | 10.7 | |
| Image plane | ∞ | | | where the surfaces of the lens elements are numbered consecutively from left to right along the optic axis.

5. The optical system of claim 2 comprising lens elements configured and positioned with respect to each other along said optic axis substantially according to a design form specified as follows:

| Surface No. | Radius (mm) | Thickness (mm) | Material |
|---|---|---|---|
| 1 | 27.70 | 2.5 | Germanium |
| 2 | 16.06 | 35.0 | |
| Conic constant: 0.256502 | | | |
| 3 | −292.29 | 3.0 | Germanium |
| Conic constant: 3.477239 | | | |
| Asphseric coefficients: | | | |
| A = .847012 × $10^{-5}$  B = .101446 × $10^{-7}$  C = .268179 × $10^{-11}$  D = .1587402 × $10^{-12}$ | | | |
| 4 | −89.53 | 10.0 | |
| 5 | 238.76 | 4.0 | Silicon |
| 6 | −62.61 | 2.0 | |
| 7 | ∞ | 2.5 | Silicon |
| 8 | ∞ | 1.0 | |
| Aperture stop | ∞ | 15.2 | |
| Image plane | ∞ | | | where the surfaces of the lens elements are numbered consecutively from left to right along the optic axis.

6. The optical system of claim 2 comprising lens elements configured and positioned with respect to each other along said optic axis substantially according to a design form specified as follows:

| Surface No. | Radius (mm) | Thickness (mm) | Material |
|---|---|---|---|
| 1 | 122.24 | 2.5 | Silicon |
| 2 | 36.29 | 56.0 | |
| 3 | −76.16 | 3.0 | Silicon |
| Conic constant: 7.924001 | | | |
| 4 | −65.17 | 33.0 | |
| 5 | −71.97 | 3.5 | Silicon |
| 6 | −53.17 | 9.0 | |
| 7 | 33.26 | 3.5 | Silicon |
| 8 | 51.89 | 5.0 | |
| 9 | ∞ | 2.0 | Sapphire |

-continued

| Surface No. | Radius (mm) | Thickness (mm) | Material |
|---|---|---|---|
| Aperture stop | ∞ | 17.1 | |
| Image plane | ∞ | | | where the surfaces of the lens elements are numbered consecutively from left to right along the optic axis.

7. The optical system of claim 2 comprising lens elements configured and positioned with respect to each other along said optic axis substantially according to a design form specified as follows:

| Surface No. | Radius (mm) | Thickness (mm) | Material |
|---|---|---|---|
| 1 | 62.41 | 2.5 | Germanium |
| 2 | 32.08 | 60.0 | |
| 3 | −82.43 | 3.0 | Germanium |
| | Conic constant: 9.118296 | | |
| 4 | −74.77 | 34.0 | |
| 5 | −64.26 | 5.0 | Germanium |
| 6 | −53.56 | 1.0 | |
| 7 | 38.22 | 5.0 | Germanium |
| 8 | 53.00 | 8.0 | |
| Aperture stop | ∞ | 17.4 | |
| Image plane | ∞ | | | where the surfaces of the lens elements are numbered consecutively from left to right along the optic axis.

* * * * *